Patented Nov. 22, 1927.

1,649,833

UNITED STATES PATENT OFFICE.

HARRY F. LEWIS, OF BUFFALO, NEW YORK, ASSIGNOR TO NATIONAL ANILINE & CHEMICAL COMPANY, INC., OF NEW YORK, N. Y., A CORPORATION OF NEW YORK.

MANUFACTURE OF OXIDATION PRODUCTS OF ACENAPHTHENE.

No Drawing.   Application filed January 24, 1921. Serial No. 439,600.

This invention relates to an improved method or process for the manufacture of oxidation products of acenaphthene and more particularly to the manufacture of acenaphthylene from acenaphthene and the manufacture of acenaphthaquinone and naphthalic anhydrid from acenaphthene or acenaphthylene.

It is known that acenaphthene can be oxidized by such oxidizing agents as an acid solution of sodium dichromate, but the methods commonly employed for this oxidation involve the use of costly oxidizing reagents, while the products obtained are frequently produced in forms which make the products difficult to separate and purify. Moreover, naphthalic anhydrid is not directly produced by such wet oxidation methods, but naphthalic acid is produced instead of the anhydrid, and requires heating and dehydration to give the anhydrid therefrom. This heating and dehydration, moreover, is accompanied with some decomposition of the naphthalic acid or anhydrid.

It has also been proposed to produce acenaphthylene from acenaphthene by the action of lead oxide at high temperatures, the lead oxide furnishing the oxygen for the oxidation; and also to effect the production of acenaphthylene from acenaphthene by the action of high temperatures in the presence of vapors of carbon dioxide; but the manufacture of acenaphthylene by such methods is a difficult and tedious task, and the products obtained by these methods are frequently difficult to separate and purify.

The present invention largely overcomes or minimizes the objections and difficulties of such prior proposals, and enables the oxidation of acenaphthene for example to be carried out in a simple and advantageous manner, for the production therefrom, for example, of acenaphthylene or naphthalic anhydrid as the main products of the process.

The present invention is based upon the discovery that acenaphthene can be readily oxidized by heating the acenaphthene until it passes into the vapor phase, mixing the acenaphthene vapor, either during or subsequent to its production, with an oxygen-containing gas mixture such as air, and passing the resulting mixture over finely divided metal oxides as catalytic agents at an elevated temperature appropriate to the catalytic oxidation.

The improved process of the present invention can be carried out with different metal oxides as catalytic agents, and more particularly oxides of such metals as form oxides of different degrees of oxidation. Among the metal oxides that are of particular value in the process of the present invention may be mentioned oxides of manganese, oxides of molybdenum and oxides of vanadium. In a limited measure, however, the same or similar catalytic effects are also shown by the oxides of other metals such as iron, nickel, cobalt, etc.

I have further discovered that the catalytic oxidation of acenaphthene can be regulated, for example, by regulation of the temperature and the particular metal oxide employed as a catalytic agent, so that acenaphthylene can be obtained as the main product of the oxidation, or so that naphthalic anhydrid can be obtained as the main product of the oxidation. For example, manganese dioxide is of special value for use in the production of acenaphthylene, by carrying out the oxidation of the acenaphthene at a suitably regulated temperature, for example, between 300 and 450° C. The present invention, accordingly, involves improvements in the production of acenaphthylene, as well as the production of naphthalic anhydrid, by the catalytic oxidation of acenaphthene in the manner described.

The invention includes also certain improvements in the separation of naphthalic anhydrid and acenaphthylene where both of these products are produced in notable amounts during the catalytic oxidation. I have found that, by suitable regulation of the condensation of the vapors resulting from the catalytic oxidation of acenaphthene, the naphthalic anhydrid can be fractionally condensed first, at a temperature around 100 to 200° C., while the acenaphthylene and unchanged acenaphthene will pass on uncondensed and can be subsequently condensed at a lower temperature in a separate condenser. Where naphthalic anhydrid is thus desired as the main product of the process, it can be directly produced in a state of relatively high purity, and the acenaphthylene and unchanged acenaphthene which are subsequently condensed can be returned to the process for reuse, so that the acenaphthylene, as well as the acenaphthene, will undergo further catalytic oxidation for the production of naphthalic anhydrid therefrom. The present invention, accordingly, includes improvements in the oxidation of acenaphthylene, as well as of acenaphthene, for the production of naphthalic anhydrid therefrom.

In general, the temperature range within which the process of the present invention should be kept is within the range of from 200 to 600° C. If the temperature is too low, the process does not take place with sufficient rapidity or completeness, while if the temperature is too high, objectionable over-oxidation or decomposition is liable to take place with decrease in the yields of the product or products desired. In practice, it will usually be more advantageous not to let the temperature fall much below 300° or to raise it very greatly above 500°. So also, as above noted, the course of the reaction can be regulated, to a certain extent, by regulation of the temperature; lower temperatures, with oxides of vanadium molybdenum and manganese, being more favorable to the production of acenaphthylene, and higher temperatures with these same oxides being more favorable to the production of naphthalic anhydrid. Other oxidation products than acenaphthylene and naphthalic anhydrid may also be produced. For example, acenaphthaquinone may be produced in varying amounts and may be recovered as a product of the operation. It may thus be separated out, by fractional condensation at an intermediate temperature between that of separation of the naphthalic anhydrid and that of separation of the acenaphthylene and acenaphthene; or it can be separated from the naphthalic anhydrid or acenaphthylene or both by suitable methods of separation.

The invention will be further illustrated by the following more detailed description of certain specific example thereof:

*Example.*—Acenaphthene in the vapor phase and air are allowed to mix in a heated chamber, using a considerable excess of the air e. g. 9 to 12 volumes, over and above the proportion theoretically required to oxidize the acenaphthene to acenaphthylene, and the mixture of heated air and acenaphthene vapor is passed into a reaction chamber maintained at a temperature ranging from 300 to 450° C., and preferably at a temperature of about 400° C. In this chamber the gas mixture is forced into contact with oxides of manganese in the form of fine powder, for example, supported on trays where the current of mixed gases may pass over and through it. The gases are kept under a slight pressure sufficient to cause them to flow continuously through the reaction chamber. The product of the reaction consists mainly of acenaphthylene admixed with some unconverted acenaphthene. This product is condensed in a suitable condenser and thus recovered in a solid state. The acenaphthylene can be separated from the acenaphthene by sublimation and fractional condensation and the acenaphthene used over again in the process.

If the reaction is carried out at higher temperatures, for example, materially above 500° C., with oxides of manganese as the catalytic agent, naphthalic anhydrid is formed to some extent, but this particular catalytic agent, i. e., oxides of manganese, I have found to be particularly advantageous for use in the production of acenaphthylene from acenaphthene, rather than for the production of naphthalic anhydrid. Acenaphthylene can similarly be produced, with oxides of vanadium and molybdenum, particularly at lower temperatures, around 300°, while at higher temperatures, e. g., around 400 to 475° C., naphthalic anhydrid is formed in relatively large amount, or mixtures consisting mainly of acenaphthylene and naphthalic anhydrid in varying amounts. With iron oxide as the catalytic agent, a mixture of acenaphthylene and naphthalic anhydrid, can similarly be produced, but the yields are usually lower, and I regard the use of iron oxide as less advantageous. The oxides of nickel and cobalt are of more particular value for the production of naphthalic anhydrid as the main product of the oxidation.

The metal oxides may be used in the form of fine powders and suitably supported, for example, on trays in such a manner that the mixed gases or gases and vapors may pass over or through the oxide or oxides. Instead of using the metallic oxides alone, they may be admixed with other substances which may either be inert in character and serve as carriers for the oxides, or which may even contribute to the catalytic oxidation, such as silica, magnesium oxide or other alkaline earth oxides, pumice, etc. So also, the gaseous mixture can be brought into contact with the catalytic material or passed therethrough, in various ways. The form or type of apparatus employed for carrying out the oxidation, as well as the means for heating the gases and catalytic material, or the reaction chamber in which the reaction takes place, can also be varied, and the reaction chamber heated, for example. electrically, or by products of combustion, or by direct heat, or otherwise.

Where acenaphthylene and naphthalic anhydrid are both produced in considerable amount during the catalytic oxidation, either with or without the production of appreciable amounts of acenaphthaquinone, the products of the oxidation can advantageously be separated by fractional condensation so that the naphthalic anhydrid will be directly obtained in a relatively pure state. This can be readily effected by passing the vapors resulting from the reaction through a condenser maintained at a regulated temperature between about 100 and 200° C., at which temperature the naphthalic anhydrid condenses, while the acenaphthylene and unchanged acenaphthene pass on and can be subsequently condensed in the cooled portion of the condenser, or in a condenser at a lower temperature, for example, at temperatures not exceeding about 75° C. or even at room temperature. The naphthalic anhydrid is thus obtainable in a relatively pure state, while the acenaphthene and acenaphthylene which are condensed together can be returned to the process and used in the next run. By thus returning the acenaphthylene, together with unchanged acenaphthene, the naphthalic anhydrid becomes the main product of the process, and, by retreating the acenaphthylene and unchanged acenaphthene, the yield of naphthalic anhydrid can be correspondingly increased, and a high yield or efficiency of conversion, based upon the total acenaphthene originally used, can thus be obtained.

Where acenaphthylene is thus returned for further treatment, it is vaporized along with the unchanged acenaphthene and the combined vapors, in admixture with air, and preheated to an appropriate temperature, are then subjected to further oxidation in the reaction chamber, by the use of an oxidizing agent such as manganese dioxide, and a further production of naphthalic anhydrid brought about. The present invention, accordingly, includes the catalytic oxidation of acenaphthylene for the production of naphthalic anhydrid therefrom, as well as the catalytic oxidation of acenaphthene for the production of either acenaphthylene or naphthalic anhydrid, or a mixture of both, etc.

Where acenaphthaquinone is produced in appreciable amount in admixture with the other products of oxidation, it can be separated in any suitable manner, for example, naphthalic anhydrid can be separated from the acenaphthaquinone by dissolving out the anhydrid with alkali. When the acenaphthaquinone is mixed with acenaphthylene, the acenaphthaquinone can be dissolved out of the mixture with sodium bisulfite.

It will thus be seen that the present invention is of more or less general application for the production of different products of oxidation, such as acenaphthylene, naphthalic anhydrid, etc., from acenaphthene, or of naphthalic anhydrid from acenaphthylene; and involves the catalytic oxidation of the acenaphthene or acenaphthylene in the vapor phase, using oxygen-containing gases as the oxidizing agent and catalytic material such as the oxides of manganese. The process of the invention is capable of some variation, as well as regulation, for example, in the ratio of air or other oxygen-containing gas to the vapor of the acenaphthene, the temperature of oxidation, the particular catalytic agent employed, etc., so that one or another product may be produced as the primary product of the process. I have thus found it possible to produce either naphthalic anhydrid or acenaphthylene with yields of 90% and higher, based on the original acenaphthene employed.

Instead of using air as the oxygen-containing gas, gaseous mixtures richer in oxygen, or oxygen itself, can be used, to obtain an increased or decreased degree or rate of oxidation, or the air may be mixed with a gas which is relatively inert under the conditions of the process.

The process of the present invention can be carried out at substantially atmospheric pressure or preferably with a slight excess of pressure of the mixed gas and vapor sufficient to cause the gas and vapor to flow continuously through the reaction chamber at the appropriate rate. The process can, however, be carried out at pressures other than atmospheric, for example, under a reduced pressure of greater or less degree, as well as under a pressure considerably in excess of atmospheric.

I claim:

1. The method of producing acenaphthylene, which comprises subjecting acenaphthene in the vapor phase to oxidation with an oxygen-containing gas in the presence of oxide of manganese.

2. The method of producing acenaphthylene, which comprises subjecting acenaphthene in the vapor phase to oxidation with atmospheric air in the presence of oxide of manganese at temperatures within the range of about 300 to 450° C.

3. The method of producing acenaphthylene, which comprises subjecting acenaphthene in the vapor phase to oxidation with atmospheric air in the presence of oxide of manganese at a temperature of about 400° C.

In testimony whereof I affix my signature.

HARRY F. LEWIS.